(12) United States Patent
Barrett et al.

(10) Patent No.: US 9,078,400 B2
(45) Date of Patent: Jul. 14, 2015

(54) METHOD AND APPARATUS FOR ENVIRONMENTAL CONTROL ACCORDING TO PERCEIVED TEMPERATURE

(75) Inventors: Neil John Barrett, Castle Hill (AU); Bruce Nation Beilby, Little Bay (AU)

(73) Assignee: Montec Pty. Ltd, Castle Hill (AU)

( * ) Notice: Subject to any disclaimer, the term of this patent is extended or adjusted under 35 U.S.C. 154(b) by 1456 days.

(21) Appl. No.: 10/589,694

(22) PCT Filed: Feb. 15, 2005

(86) PCT No.: PCT/AU2005/000271
§ 371 (c)(1),
(2), (4) Date: Apr. 8, 2008

(87) PCT Pub. No.: WO2005/082134
PCT Pub. Date: Sep. 9, 2005

(65) Prior Publication Data
US 2008/0203178 A1  Aug. 28, 2008

(30) Foreign Application Priority Data

Mar. 1, 2004  (AU) ................. 2004901054

(51) Int. Cl.
*F24F 3/14*   (2006.01)
*F24F 11/00*  (2006.01)
(Continued)

(52) U.S. Cl.
CPC .............. *A01G 1/001* (2013.01); *A01K 1/0047* (2013.01); *A01K 31/00* (2013.01); *F24F 11/001* (2013.01); *F24F 11/0012* (2013.01); *F24F 11/0015* (2013.01); *F24F 2011/0038* (2013.01)

(58) Field of Classification Search
CPC ..... A01K 1/0047; A01K 31/00; F24F 11/001; F24F 11/0012; F24F 11/0015; F24F 2011/0038
USPC ...... 236/44 C, 49.3, 91 C; 454/258; 119/174, 119/418, 436, 437, 444, 448
See application file for complete search history.

(56) References Cited

U.S. PATENT DOCUMENTS 33,600 A * 10/1861 Timmons ..................... 236/49.3
4,227,645 A  10/1980 de La Farge et al.
(Continued)

FOREIGN PATENT DOCUMENTS

DE  41 27 179   2/1993
EP  0 476 692   12/1996

OTHER PUBLICATIONS

"Calculating Windchill Values" by Bob Rilling, National Center for Atmospheric Reseach, 2 pages, Feb. 12, 1996.*
(Continued)

*Primary Examiner* — Marc Norman
*Assistant Examiner* — Paolo Gonzalez
(74) *Attorney, Agent, or Firm* — Ladas & Parry LLP

(57) ABSTRACT

Automated methods, apparatuses and computer program products for controlling environmental parameters in a defined environment are disclosed herein. One method disclosed includes the steps of: measuring values of temperature, relative humidity, and wind velocity in the environment, calculating a value of perceived temperature as a function of the measured values, and controlling the environmental parameters based on the calculated value. In certain embodiments, the defined environment comprises a chicken house and the temperature perceived by the chickens in the chicken house is calculated as a function of a characteristic of the chickens such as age or weight.

17 Claims, 4 Drawing Sheets

(51) Int. Cl.
  G05D 22/02    (2006.01)
  A01G 1/00     (2006.01)
  A01K 1/00     (2006.01)
  A01K 31/00    (2006.01)

(56) References Cited

U.S. PATENT DOCUMENTS

| | | | | |
|---|---|---|---|---|
| 4,700,887 | A | * | 10/1987 | Timmons ............... 236/49.3 |
| 5,170,935 | A | * | 12/1992 | Federspiel et al. ......... 236/44 C |
| 5,482,210 | A | | 1/1996 | Carey et al. |
| 5,732,879 | A | | 3/1998 | Low |
| 2002/0128776 | A1 | * | 9/2002 | Myers et al. ............... 702/3 |
| 2004/0065268 | A1 | * | 4/2004 | Terrell et al. ............. 119/448 |

OTHER PUBLICATIONS

"Effective Temperature for Chicks & Broilers" by Ventilation—R. Barnwell, 2 pages, 2004.*
"Temperature-Humidity-Velocity Index for Market-size Broilers" by Tao et al., pp. 1-13, Jul. 1, 2003.*
Cobb Technical focus, publication of Cobb-Vantress, Inc., One-2002.
The Alabama Poultry Engineering and Economics Newsletter, Auburn University, No. 2, Oct. 1999.
Patent Abstracts of Japan of 11-225599 dated Aug. 24, 1999.
Office Action from the Chinese Patent Office dated Dec. 13, 2010 in respect of corresponding Chinese Application No. 200580011688.2 with English translation.
Cobb Broiler Management Guide, 2004, 63 pages.
Cobb Focus, 4 pages.
May, J. D., et al., The Effect of Environmental Temperature on Growth and Feed Conversion of Broilers to 21 Days of Age *USDA, Agricultural Research Service, South Central Poultry Research Laboratory*, pp. 669-671.
The Poultry Informed Professional, Department of Avian Medicine, University of Georgia, Issue 39, Jul. 2000, pp. 1-9.
von Wettstein, Diter, et al., "Improved barley broiler feed with transgenic malt containing heat-stable $(1,3-1,4)\beta$-glucanase",*Department of Crop and Soil Sciences and School of Molecular Biosciences, and Department of Animal Sciences* vol. 97, No. 25, pp. 13512-13517.

* cited by examiner

METHOD AND APPARATUS FOR ENVIRONMENTAL CONTROL ACCORDING TO PERCEIVED TEMPERATURE

FIELD OF THE INVENTION

The present invention relates to monitoring and controlling environmental parameters generally and more particularly to environmental control in chicken houses.

BACKGROUND

Environmental control provides significant benefits when applied to production cycles of chickens and other species and varieties of animals and plants. Whilst increased mortality rates result from extreme environmental conditions, optimal environmental conditions positively impact on growth and general well being. For example, feed conversion and weight gain ratios can be improved through environmental control.

Three main inter-related environmental parameters have a significant influence in a chicken house, namely temperature, humidity and wind velocity. Specifically, links exist between temperature, humidity, and bird age or weight in terms of heat stress and between wind velocity, temperature and bird age or weight in terms of wind chill.

The temperature that the birds actually experience as opposed to the temperature directly measured within a chicken house is known as a perceived temperature. Generally, chickens feel warmer as the humidity increases and cooler as the wind velocity increases. Age, and in particular bird weight, also has a direct bearing on the effects of these parameters. For example, young chicks are sensitive to wind chill and are easily over-cooled if exposed to wind. Stress resulting from over-cooling may result in reduced weight gain throughout a production cycle (nominally 5 to 8 weeks).

Conventional environmental control systems use measured temperature as an input to a feedback control loop to control or regulate ventilation cooling in a chicken house. Chicken houses are generally cooled by the activation and de-activation of fans that blow air down the length or across the width of the house. The wind cools the birds by way of a wind chill effect. Air may also be brought in through pads which have been sprayed with water to further aid cooling in an evaporative cooling process.

Whilst such rudimentary control may be capable of maintaining temperature levels within certain limits and influencing humidity levels to a limited degree, effective humidity control requires capital-intensive air conditioning equipment and is thus not generally used in the agricultural industry.

There exists a standard heat stress equation for human comfort levels that describes the relationship between temperature (dry bulb), Heat Index (HI) and humidity. FIG. 4 shows a graph of HI curves as a function of temperature and humidity levels, as well as the locus of points indicating the points at which HI=T.

The U.S. Weather Services uses the standard equation for Heat Index (HI), with constants adapted for human comfort levels, in the following form:

$$HI = -42.379 + 2.04901523T + 10.14333127H -$$
$$0.22475541TH - 6.83783 \times 10^{-3}T^2 - 5.481717 \times 10^{-2}H^2 +$$
$$1.22874 \times 10^{-3}T^2H + 8.5282 \times 10^4 TH^2 - 1.99 \times 10^{-6}T^2H^2$$

where:
T=ambient dry bulb temperature in ° F., and
H=relative humidity (%)

A Heat Index of greater than 130° F. (54.4° C.) is indicative of conditions that are extremely dangerous for human beings.

Whilst it is desirable to automate control of environmental parameters in a feedback control loop, a difficulty arises in unifying the parameters in a single solution due to the complexity of the standard heat stress equation. Further, the standard equation is unstable in that small variations to constants in the equation result in large variations in output of the equation. A need thus exists for an improved method and apparatus for controlling environmental parameters of temperature, relative humidity and wind chill. Another need exists for an improved method and apparatus for controlling environmental parameters in a chicken house.

SUMMARY

According to an aspect of the present invention, there is provided an automated method for controlling environmental parameters in a defined environment. The method comprises the steps of measuring values of temperature, relative humidity, and wind velocity in the environment, converting values of temperature measured at corresponding values of relative humidity to values of perceived temperature at a constant reference value of relative humidity, and controlling the environmental parameters based on the values of perceived temperature.

The method may comprise the further steps of calculating an optimum perceived temperature based on the age of the chickens, and calculating hot and cold stress limits for the chickens based on the optimum perceived temperature.

The method may still further comprise the step of calculating stress levels experienced by the chickens, wherein the stress levels are calculated as a function of the hot and cold stress limits and the values of perceived temperature.

The method may yet further comprise the step of calculating a value of accumulated stress of said chickens during a production cycle.

According to another aspect of the present invention, there is provided an apparatus for controlling environmental parameters in a defined environment. The apparatus comprises a memory unit for storing data and instructions to be performed by a processing unit and a processing unit coupled to the memory unit. The processing unit is programmed to obtain measured values of temperature, relative humidity, and wind velocity relating to the environment, convert values of temperature measured at corresponding values of relative humidity to values of perceived temperature at a constant reference value of relative humidity, and provide the calculated values of perceived temperature for controlling the environmental parameters.

In yet another aspect of the present invention, there is provided a computer program product comprising a computer readable medium having a computer program recorded therein for controlling environmental parameters in a defined environment. The computer program product comprises computer program code means for measuring values of temperature, relative humidity, and wind velocity in the environment, computer program code means for converting values of temperature measured at corresponding values of relative humidity to values of perceived temperature at a constant reference value of relative humidity, and computer program code means for outputting the calculated values of perceived temperature for controlling the environmental parameters.

Other aspects of the present invention provide an automated method, an apparatus and a computer program product for controlling environmental parameters in a chicken house. The method comprises the steps of measuring values of temperature, relative humidity, and wind velocity in the chicken house; determining wind chill as a function of said measured values of temperature and wind velocity, and at least one characteristic of chickens in said chicken house; determining values of perceived temperature at a constant reference value of relative humidity as a function of corresponding wind chill-compensated values of temperature measured at corresponding values of relative humidity and at least one characteristic of chickens in said chicken house; and controlling the environmental parameters based on the values of perceived temperature. The apparatus and computer program product are used to perform the foregoing method.

BRIEF DESCRIPTION OF THE DRAWINGS

Features and preferred embodiments of the present invention are described hereinafter, by way of example only, with reference to the accompanying drawings in which.

DETAILED DESCRIPTION

Figure 1:
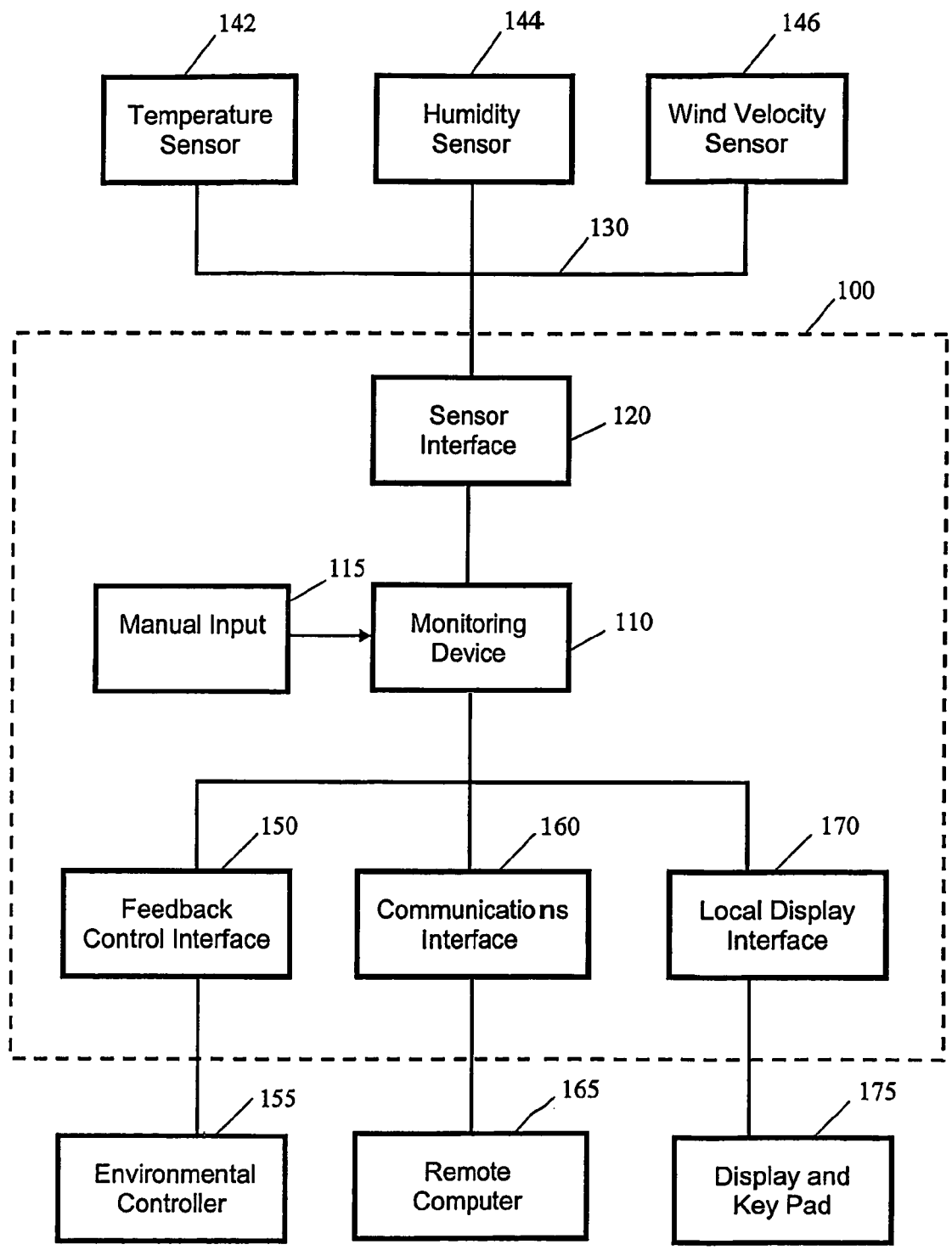
FIG. 1 is a block diagram of a system for monitoring and controlling environmental parameters.

Embodiments of methods and apparatuses are described hereinafter for monitoring and controlling environmental parameters. While the methods and apparatuses are described with specific reference to environmental control in a chicken house, it is not intended that the present invention be limited to such application as the principles of the present invention have general applicability to environmental control for numerous other purposes. For example, embodiments of the present invention may be applied to agricultural environments for the production of various animals and plants. Embodiments of the present invention may also be practised to control human comfort levels.

As stated hereinbefore, a difficulty exists in unifying environmental parameters in a single solution due to the complexity of the standard heat stress equation.

Within the continuum of values that the standard heat stress equation generates, there exists a locus of points on which the heat stress index (otherwise known as the perceived temperature) is equal to the measured temperature. However, the individual points relate to different values of humidity. A practical unified solution is aided when the points on the locus, at which the measured temperature equals the perceived temperature, occur at a constant value of humidity. For convenience, this value may be defined as the 50% point of relative humidity where the measured temperature (ignoring wind chill) is equal to the perceived temperature. Alternatively, other values of relative humidity can be used. Consequently, the optimum performance temperature for chickens, which is generally defined as a function of bird age or weight and at a particular value of relative humidity, may be transformed to a set of perceived temperature values. This approach simplifies calculations to determine the accumulated stress on the chickens as the measured data and initial calculations relate to the 50% humidity level.

Multiple regression analysis was used to minimise the complexity of the humidity/temperature equation as well as to ensure that the derived constants meet the requirement that Perceived Temperature (PT) equals T at a constant humidity of 50%. This aids in the derivation of PT, which is the equivalent temperature that would be perceived as if the relative humidity was at 50%.

The error introduced due to simplification of the standard temperature and humidity heat stress equation is insignificant when taking into account errors generated in measuring the actual parameters, the non-uniformity of the environmental conditions in chicken houses, and the inherent error within the standard equation. The error within the standard equation results from approximation of the actual value of heat index (HI). For example, the inherent error increases when the humidity is particularly low or particularly high.

Advantageously, the foregoing approach enables the temperature perceived by the birds, as a function of actual measured temperature, humidity, wind velocity and bird age or weight to be used in a feedback control loop to monitor and control the stress levels of the birds as the perceived temperature is compared with optimal environmental conditions.

FIG. 1 shows a block diagram of a system for monitoring and controlling environmental parameters. A sensor interface 120 is coupled to a temperature sensor 142, a humidity sensor 144, and a wind velocity sensor 146 via a bus interconnection 130. Other sensor types and other forms of coupling of the sensors to the sensor interface may also be practised, as would be understood by persons skilled in the art. For example, sensors for detecting ammonia levels may also be used to detect levels of ammonia that have an adverse effect on the birds and thus contribute to their stress levels. Further, it is not essential that the sensors are networked as the sensors may be individually connected to one or more sensor interfaces.

A monitoring device 110 is coupled to the sensor interface 120 and comprises a processing unit, comprising one or more microprocessors, and a memory unit for storing a software program and incoming data from the sensors. The processing unit performs computational procedures, and outputs data on command to a local display interface 170, a communications interface 160 and a feedback control interface 150. The memory unit may comprise one or more of read-only memory (ROM), electrically erasable programmable read-only memory (EEPROM), random access memory (RAM), flash memory, and/or any other form of memory known in the art. The memory unit or a portion of memory may optionally be integrated in the one or more microprocessors.

The apparatus 100 may optionally comprise a manual input 115 such as a switch or keypad for a user to manually input an indication of prevailing environmental conditions based on a visual observation of the defined environment (e.g., observation of chickens in a chicken house). This capability enables confirmation to the monitoring device 110 of, for example, optimal environmental conditions when a user detects such by way of visual inspection of the defined environment. Alternatively, confirmation of other prevailing conditions may be confirmed to the monitoring device 110. Based on a defined meaning of such a manual input, the monitoring device 110 may perform automatic calibration. Such calibration may be appropriate, for example, where estimates of chicken age and/or weight and optimum perceived temperature are inaccurate.

During use, the sensors 142, 144 and 146 are scanned by the monitoring device 110 to input current values of temperature, humidity, and wind velocity, respectively. The input values are used for performing calculations. Both the input data and the calculated values may be logged or stored in the memory unit and may be displayed on a display 175 via the local display interface 170 or accessed by a remote computer 165 via the communications interface 160. The input data and calculated values may be logged or stored in the memory unit with a date/time stamp generated from a real-time clock and/or when a change in an input value is detected. The remote computer 165 may be coupled to the communications interface 160 via a network (not shown), such as a local area network (LAN), a wide area network (WAN), a wireless network, the Internet, an intranet, and/or any other communication network known in the art.

Remote monitoring, data downloads, and software program uploads may be performed using the remote computer 165. Local interrogation data in the monitoring device 110 can be performed using the display and keypad 175.

The apparatus 100 shown in FIG. 1 receives environmental parameter values from the sensors 142, 144, and 146, performs calculations or computations based on those values, and outputs a temperature signal to an environmental controller 155 via a feedback control interface 150 integrated in the apparatus 100. The feedback control interface 150 enables transformation of data and/or signals (e.g., level, protocol, etc.) to accommodate the specifications of existing environmental controllers. The temperature signal is used by the environmental controller 155 for closed loop control of environmental parameters. For example, the environmental controller 155 may switch fans on and off to generate wind chill. In an alternative embodiment, the environmental controller 155 may be integrated in the apparatus 100.

Alarm conditions that provide warning of excessive values or variations (i.e., process limits) in the environmental parameters may be locally or remotely set by means of the display and key pad 175 and the remote computer 165, respectively. Use of a perceived temperature to trigger process limits enables the apparatus to function in high humidity conditions (at low temperatures) without setting off humidity alarms.

In one embodiment of the system shown in FIG. 1, the monitoring device 110 comprises an embedded 133 MHz x86-based STPC Atlas processor linked via an ISA bus to flash disc memory for hosting an operating system. The display 175 comprises a 2 line×20 character liquid crystal display (LCD) and a Hitachi HD44780 controller. The processor uses ANSI standard commands to control information displayed on the display 175 via the local display interface 170, which comprises an RS-232 serial data port. The processor also receives commands from the keypad 175 via the local display interface 175, implemented as an RS-232 serial data port. The remote computer 165 communicates with the processor via the communications interface 160, implemented as a 10/100 BaseT Ethernet Interface, and an internal PCI bus. The environmental controller 155 is controlled via the feedback control interface 150, implemented as a parallel data port. The sensors 142, 144 and 146 are coupled to the sensor interface 120 by way of bus interconnection 130, which comprises a 3-wire bus that enables connection of multiple sensors via a single cable. The sensor interface 120 interfaces to the processor by way of an RS-232 serial data port. The foregoing description comprises one embodiment of the system shown in FIG. 1 and is thus not intended to limit the scope of the present invention. Persons skilled in the art would readily recognise that numerous other hardware platforms and components may be used to practise the present invention. For example, the present invention may be practised as a computer program executed by a conventional or an embedded personal computer (PC). In such instances, the sensor interface 120 may be provided independently of a conventional or embedded PC. The computer program code may be recorded on a computer program product comprising a computer readable medium.

Figure 2:
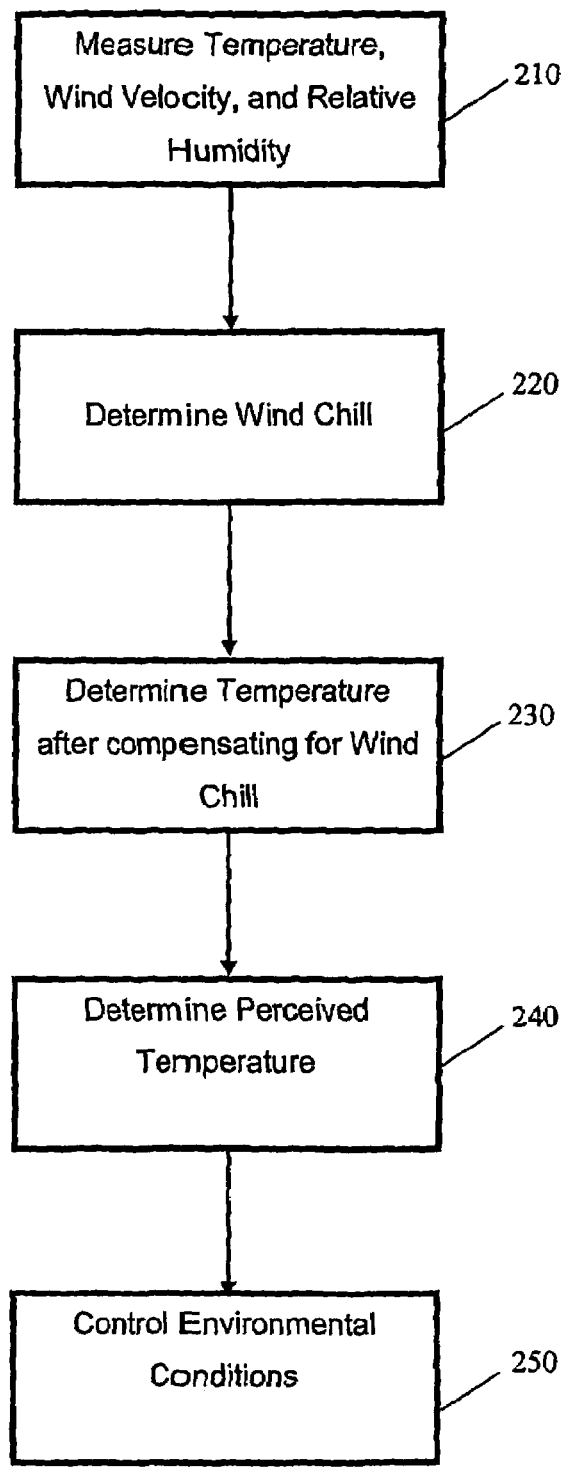
FIG. 2 is a flow diagram of a method for environmental control.

FIG. 2 shows a flow diagram of a method for environmental control, which may be practised using the apparatus of FIG. 1 or another suitable apparatus. At step 210, measured values of temperature, wind velocity, and relative humidity (%) are obtained. The wind chill is determined based on measured values of wind velocity at step 220 and the measured temperature values are reduced by the wind chill determined in step 220, at step 230. At step 240, the perceived temperature is calculated as a function of the relative humidity and the wind chill-compensated temperature that is calculated in step 230. The perceived temperature may be used to control environmental conditions at step 250.

Figure 3:
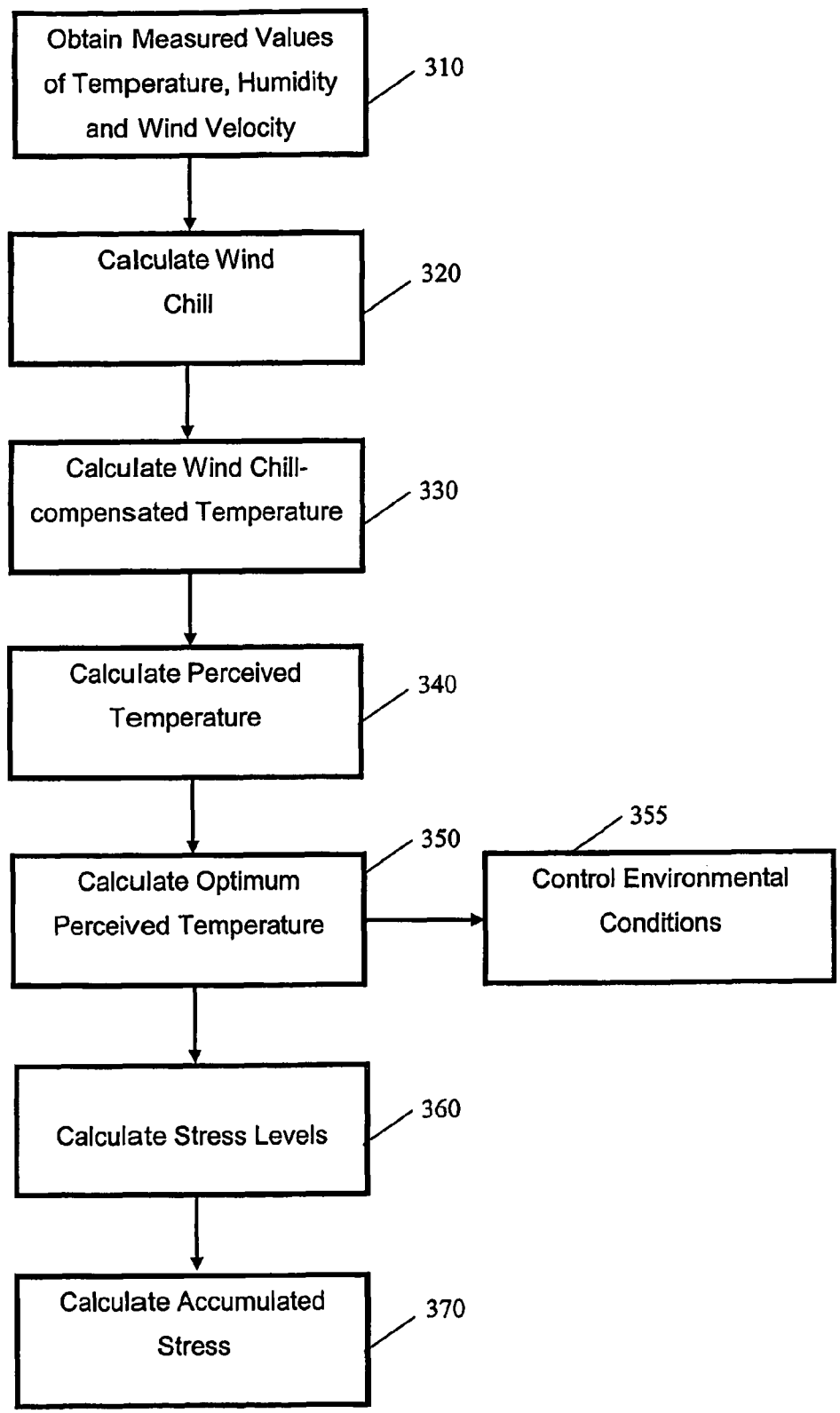
FIG. 3 is a flow diagram of a method for environmental control in a chicken house.
Figure 4:
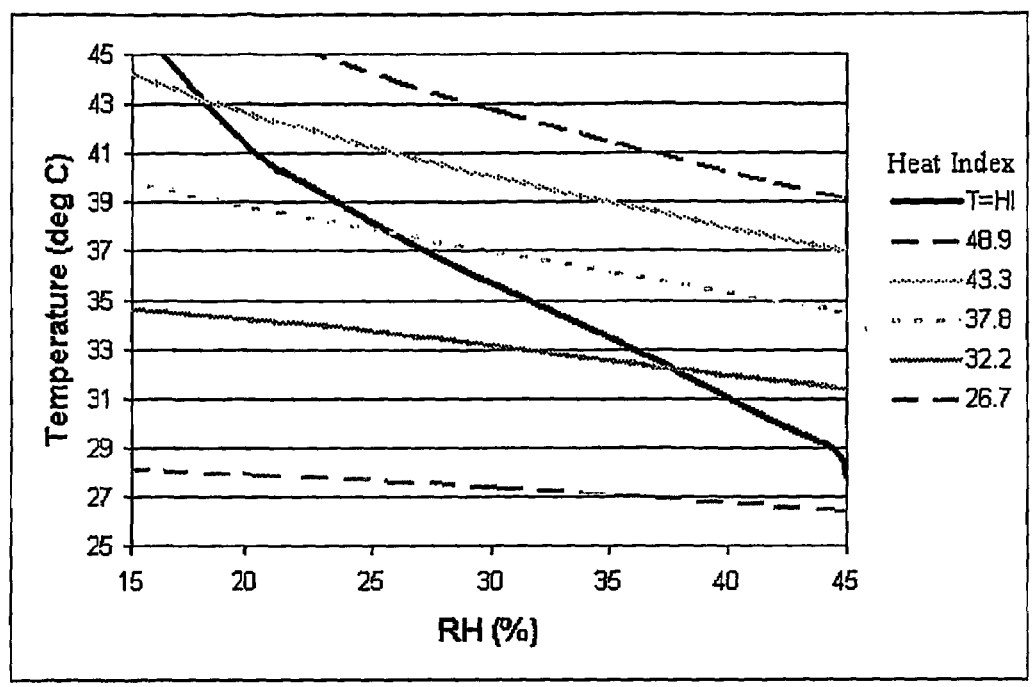
FIG. 4 is a graph of temperature as a function of relative humidity showing standard heat index curves for human comfort levels.

FIG. 3 shows a flow diagram of a method for environmental control in a chicken house, which may be practised using the apparatus of FIG. 1 or another suitable apparatus. At step 310, measured values of temperature, wind velocity, and relative humidity (%) are obtained. The wind chill is calculated at step 320 according to the following equation:

$$WC = V^p(a + bT + cT^2 + dT^3 + eT) \qquad (1)$$

where:
T=measured temperature (° C.),
V=wind velocity (m/s), and
a, b, c, d, e and p are variables dependent upon the age or weight of the birds.

In one particular embodiment, the variables used are as follows:

$$a = n_a \tilde{A} + m_a, n_a = -0.03233, m_a = 11.254$$

$$b = n_b \tilde{A} + m_b, n_b = -0.0009538, m_b = -0.05311$$

$$c = n_c \tilde{A} + m_c, n_c = 0.0005006, m_c = -0.1045$$

$$d = n_d \tilde{A} + m_d, n_d = -0.00002959, m_d = 0.006077$$

$$e = n_e \tilde{A} + m_e, n_e = 4.466E\text{-}07, m_e = -0.00008901$$

$$p = n_p \tilde{A} + m_p, n_p = -0.0009859, m_p = 0.6007$$

where:
$\tilde{A} = rA + sA^2 + tA^3 + uA^4$,
A=age of bird (days), and
r=0.05850, s=0.02605, t=0.001399, u=−2.404E-05
or:
$\tilde{A} = r + sW + tW^2$,
W=weight of bird (grams), and
r=−6.1, s=0.0323, t=2.8E-6
If $\tilde{A} < 0$ then $\tilde{A} = 0$, and
If $\tilde{A} > 92$ then $\tilde{A} = 92$.

The age and weight of the birds are tracked during a production cycle. In one embodiment, an initial estimate of the average age of the birds is input to the apparatus 100, which is subsequently automatically adjusted by means of a clock reference. A corresponding weight may be determined from a look-up table given that there is generally a consistent correlation exists the average age and weight of the birds. Alternatively, direct weight measurements may be performed on the birds.

The constants in equation 1 are stored in memory and may change with breed of chicken and production operational preferences such as optimal perceived temperatures and stress levels.

To calculate the wind chill (WC) in equation (1), it is necessary to input the age or weight of the birds (A), the temperature (T), and wind velocity (V). When the calculated value of wind chill (WC) is negative, it is assumed that the wind chill is zero.

At step 330, the wind chill-compensated temperature ($T_{wc}$) is calculated according to the following equation:

$$T_{wc} = T - WC$$

where:
T=measured temperature (° C.), and
WC=the wind chill calculated in step 310.

At step 340, the wind chill-compensated temperature ($T_{wc}$) calculated in step 330 is used to calculate the perceived temperature of the birds according to the following equation:

$$PT = T_{wc}(f + gH + H^2) + iH + jH + k \quad (2)$$

where:
H=relative humidity (%), and
f=1.4195, g=−0.0136, h=0.0001043, i=0.7026,
j=−0.00402, and k=−25.07

Adult birds can comfortably adapt to an environment within a perceived temperature range of 19 to 27° C. At a perceived temperature of PT=46° C., adult birds experience a high mortality rate in less than 2 hours.

At step 350, the optimum perceived temperature ($T_{opt}$), which reflects the optimum temperature (at 50% RH) for the production of the birds and varies depending on the age of the birds, is calculated according to the following equation:

$$T_{opt} = z + \frac{v}{1 - wA + xA^2 - yA^3} \quad (3)$$

where:
A=the age of the birds in days, and
v=10.67, w=0.03537, x=0.01169, y=0.0001271, z=21.96.
If A is greater than 39 days then $T_{opt}$=23° C.

The perceived temperature may be used as an input to control environmental conditions at step 355. Environmental conditions may be controlled by means of a feedback loop executed by an environmental controller such as the environmental controller 155 shown in FIG. 1.

At step 360, the perceived temperature (PT) is used as an input to calculate stress levels of the birds by comparing the perceived temperature (PT) to the optimal perceived temperature ($T_{opt}$) and the limits at which stress starts and continues to occur. A first set of hot and cold stress limits (SH and SC) correspond to temperature levels above and below the optimum perceived temperature ($T_{opt}$), respectively, when stress on the birds first becomes noticeable. A second set of hot and cold stress limits (DH and DC) correspond to temperature levels above and below the optimal perceived temperature ($T_{opt}$), respectively, when damage to the birds and/or excessive bird mortality after 7 hours of maintaining a high or low temperature occurs.

The first set of limits where stress starts to occur, are defined in equations 4 and 5 hereinafter:

$$SH = \epsilon + \phi T_{opt} \text{ where: } \epsilon = 9.98, \phi = 0.74 \quad (4)$$

$$SC = \gamma + \eta T_{opt} \text{ where: } \gamma = -10.24, \eta = 1.28 \quad (5)$$

The second set of limits where damage starts to occur (at 50% RH), are defined in equations 6 and 7 hereinafter:

$$DH = \alpha + \beta T_{opt} \text{ where: } \alpha = 36.09, \beta = 0.27 \quad (6)$$

$$DC = \chi + \delta T_{opt} \text{ where: } \chi = -15.69, \delta = 1.03 \quad (7)$$

If the perceived temperature (PT) is less than the cold stress limit (SC) then the cold stress level ($S_C$) is defined according to equation 8, hereinafter:

$$S_c = \lambda \Delta t \frac{(SC - PT)}{(SC - DC)} \quad (8)$$

where:
$\lambda$=1.7631E-4, and
$\Delta t$=time interval(s) between measurements If the perceived temperature (PT) is greater than the hot stress limit (SH) then the hot stress level ($S_H$) is defined according to equation 9, hereinafter:

$$S_H = \lambda \Delta t \frac{(PT - SH)}{(DH - SH)} \quad (9)$$

where:
$\lambda$=1.7631E-4, and
$\Delta t$=time interval(s) between measurements If the perceived temperature (PT) lies between the two stress limits SH and SC then both $S_C$ and $S_H$ equal zero. This is known as the thermal comfort zone. Temperatures above and below the thermal comfort zone cause increases in heat and cold stress, respectively.

At step 370, the hot and cold stress levels calculated in step 360 are accumulated (for each measurement cycle) to provide a value of accumulated stress (AS), which impacts on production efficiency. The accumulated stress (AS) is calculated according to equation 10, hereinafter:

$$AS = \Sigma(S_C + S_H) \quad (10)$$

The accumulated stress (AS) values should ideally be less than 10 at the end of a production cycle. Values in the region of 100 reflect worst case scenarios.

Advantageously, the simplified heat stress equations described hereinbefore enable the calculations to be performed directly, as opposed to iteratively, and substantially in real time by a microprocessor-based apparatus or system. As the equations include terms raised to powers and require floating point arithmetic, an embedded personal computer (PC) is an ideal computing platform for practising the invention. However, those skilled in the art will appreciate that other standard or proprietary computing platforms or hardware may be used to practise embodiments of the invention.

Embodiments of methods, apparatuses and computer program products for monitoring and controlling environmental parameters have been described hereinbefore. However, various alterations and modifications can be made to the embodiments described herein, as would be apparent to one skilled in the relevant art in the light of this disclosure, without departing from the spirit and scope of the invention.

In certain embodiments, clusters of sensors are distributed throughout a chicken house or other monitored area with the outputs of those sensors averaged to take into account non-uniformities throughout the chicken house.

In other embodiments, stress values are determined from a number of sensor clusters. Such embodiments are useful if the chickens are separated (e.g., by fencing) or if a plurality of chicken houses are monitored by the same apparatus. In such cases the temperature feedback loop may be driven by an average value of perceived temperature or a perceived temperature value from a specific cluster of sensors. Alternatively, the perceived temperature feedback loop may be averaged over a time interval to smooth out the response due to sudden activation of the fans.

By modifying the constants in the simplified equations described hereinbefore, embodiments of the present invention may be applied to monitoring amounts of surplus energy available for growth and weight gain of a broad range of agricultural processes such as the production of poultry, animals including pigs, crops and plants. Other embodiments may also be used for monitoring and/or controlling human comfort levels.

(Australia Only) In the context of this specification, the word "comprising" means "including principally but not necessarily solely" or "having" or "including", and not "consisting only of". Variations of the word "comprising", such as "comprise" and "comprises" have correspondingly varied meanings.

We claim:

1. An apparatus for controlling environmental parameters in a defined environment, said apparatus comprising:
   a memory unit for storing data and instructions to be performed by a processing unit;
   temperature, relative humidity and wind velocity sensors for measuring temperature, relative humidity and wind velocity relating to said environment and
   the processing unit coupled to said memory unit and said sensors, said processing unit programmed to:
   obtain measured values of temperature, relative humidity, and wind velocity relating to said environment from said sensors;
   calculate values of perceived temperature as a function of said measured values of temperature, relative humidity, and wind velocity, using an equation based on a specified relative humidity and of the form:

$$PT = T_{wc}(f + gH + hH^2) + iH + jH^2 + k;$$

wherein:
   PT=perceived temperature;
   $T_{wc}$=wind chill-compensated temperature;
   H=relative humidity; and
   f, g, h, i, j and k are constants; and
   automatically controlling said environmental parameters based on said values of perceived temperature.

2. The apparatus of claim 1, further comprising an interface for providing said values of perceived temperature to an environmental controller.

3. The apparatus of claim 1 further comprising a controller for controlling said environmental parameters in response to said values of perceived temperature.

4. The apparatus of claim 1, wherein said defined environment comprises a chicken house and said perceived temperature is representative of a temperature perceived by chickens in said chicken house.

5. The apparatus of claim 4, wherein said processing unit is further programmed to calculate said perceived temperature as a function of a characteristic of said chickens.

6. The apparatus of claim 5, wherein said characteristic is selected from the group of characteristics consisting of:
   age of said chickens; and
   weight of said chickens.

7. The apparatus of claim 4, wherein said processing unit is further programmed to:
   calculate an optimum perceived temperature based on a characteristic of said chickens; and
   calculate hot and cold stress limits for said chickens based on said optimum perceived temperature, wherein said hot and cold stress limits correspond to temperature values above and below said optimum perceived temperature, respectively.

8. The apparatus of claim 7, wherein said processing unit is further programmed to calculate stress levels experienced by said chickens as a function of said stress limits and said perceived temperature.

9. The apparatus of claim 5, wherein said processing unit is further programmed to calculate a value of accumulated stress of said chickens during a production cycle.

10. The apparatus of claim 1, wherein said perceived temperature comprises a temperature perceived by a living being in said defined environment, said living being selected from the group consisting of:
    animals; and
    plants.

11. The apparatus of claim 1, wherein said processing unit is programmed to determine wind chill based on said measured values of temperature and wind velocity, and calculate said perceived temperature as a function of said wind chill-compensated value of said measured temperature.

12. The apparatus of claim 1, wherein the specified relative humidity is 50%.

13. The apparatus of claim 1, wherein said constants comprise the following values: f=1.4195, g=−0.0136, h=0.0001043, i=0.7026, j=−0.00402, and k=−25.07.

14. The apparatus of claim 1, wherein said wind chill-compensated temperature ($T_{wc}$) is calculated using an equation of the form:

$$T_{wc} = T - (V^p(a + bT + cT^2 + dT^3 + eT^4)); \text{ and}$$

wherein:
    T=measured temperature;
    V=wind velocity; and
    a, b, c, d, e, and p are variables dependent on age or weight of occupants of said defined environment.

15. An apparatus for controlling environmental parameters in a chicken house, said apparatus comprising:
    a memory unit for storing data and instructions to be performed by a processing unit;
    temperature, relative humidity and wind velocity sensors for measuring temperature, relative humidity and wind velocity relating to said environment; and
    the processing unit coupled to said memory unit and said sensors, said processing unit programmed to:
    obtain measured values of temperature, relative humidity, and wind velocity in said chicken house from said sensors;
    determine wind chill as a function of said measured values of temperature and wind velocity, and at least one characteristic of chickens in said chicken house;
    determine values of perceived temperature at a constant reference value of relative humidity as a function of corresponding wind chill-compensated values of temperature measured at corresponding values of relative humidity and at least one characteristic of chickens in said chicken house using an equation of the form:

$$PT = T_{wc}(f + gH + hH^2) + iH + jH^2 + k;$$

wherein:
    PT=perceived temperature;
    $T_{wc}$=wind chill-compensated temperature;
    H=relative humidity; and
    f, g, h, i, j and k are constants; and
    control said environmental parameters automatically based on said values of perceived temperature.

16. The apparatus of claim 15, wherein said constants comprise the following values: f=1.4195, g=−0.0136, h=0.0001043, i=0.7026, j=−0.00402, and k=−25.07.

17. The apparatus of claim 15, wherein said wind chill-compensated temperature ($T_{wc}$) is calculated using an equation of the form:

$$T_{wc} = T - (V^p(a + bT + cT^2 + dT^3 + eT^4)); \text{ and}$$

wherein:
    T=measured temperature;
    V=wind velocity; and
    a, b, c, d, e, and p are variables dependent on at least one characteristic of chickens in said chicken house.

* * * * *

UNITED STATES PATENT AND TRADEMARK OFFICE
CERTIFICATE OF CORRECTION

| | | |
|---|---|---|
| PATENT NO. | : 9,078,400 B2 | Page 1 of 1 |
| APPLICATION NO. | : 10/589694 | |
| DATED | : July 14, 2015 | |
| INVENTOR(S) | : Neil John Barrett et al. | |

It is certified that error appears in the above-identified patent and that said Letters Patent is hereby corrected as shown below:

On the Title page, Item (73), Assignee: "Montec" should read --Monitec--.

On the Title page, Item (22), PCT filing date: "Feb. 15, 2005" should read --Feb. 25, 2005--.

Signed and Sealed this
Fifteenth Day of March, 2016

Michelle K. Lee
*Director of the United States Patent and Trademark Office*